US005564158A

United States Patent [19]
Bauer et al.

[11] Patent Number: 5,564,158
[45] Date of Patent: Oct. 15, 1996

[54] WIPER ARM FOR WINDSHIELD WIPERS OF AUTOMOTIVE VEHICLES

[75] Inventors: Kurt Bauer, Ingersheim; Eckhardt Schmid, Brackenheim, both of Germany

[73] Assignee: ITT Automotive Europe GmbH, Germany

[21] Appl. No.: 313,280

[22] PCT Filed: Apr. 1, 1993

[86] PCT No.: PCT/EP93/00790

§ 371 Date: Oct. 4, 1994

§ 102(e) Date: Oct. 4, 1994

[87] PCT Pub. No.: WO93/19956

PCT Pub. Date: Oct. 14, 1993

[30] Foreign Application Priority Data

Apr. 4, 1992 [DE] Germany ............... 42 11 326.1

[51] Int. Cl.⁶ ............................................. B60S 1/32
[52] U.S. Cl. .................. 15/250.351; 15/250.352; 15/250.31; 428/577
[58] Field of Search .............. 15/250.351, 250.352, 15/250.34, 250.33, 250.201, 250.202, 250.31, 250.30; 428/577, 595; 29/897.2

[56] References Cited

U.S. PATENT DOCUMENTS

| 2,191,423 | 2/1940 | Browne | 15/250.351 |
| 2,850,755 | 9/1958 | Deibel | 15/250.351 |
| 3,102,295 | 9/1963 | Reese | 15/250.352 |
| 3,344,458 | 10/1967 | Deibel | 15/250.352 |
| 3,383,731 | 5/1968 | Krohm | 15/250.352 |
| 5,319,826 | 6/1994 | Mower | 15/250.44 |

FOREIGN PATENT DOCUMENTS

| 201792 | 5/1956 | Australia | 15/250.351 |
| 0369672 | 5/1990 | European Pat. Off. . | |
| 2517609 | 6/1983 | France . | |
| 2648414 | 12/1990 | France . | |
| 745256 | 3/1944 | Germany | 15/250.34 |
| 1205402 | 11/1965 | Germany | 15/250.352 |
| 3909165 | 10/1989 | Germany . | |
| 853475 | 11/1960 | United Kingdom | 15/250.352 |
| 8403866 | 10/1984 | WIPO | 15/250.351 |

Primary Examiner—Gary K. Graham
Attorney, Agent, or Firm—J. Gordon Lewis; Thomas N. Twomey

[57] ABSTRACT

An arm head for use in a wiper assembly. The arm head is designed to align the wiper blade perpendicular to the windshield of the automotive vehicle in a way that eliminates the need to bend the wiper rod.

10 Claims, 3 Drawing Sheets

WIPER ARM FOR WINDSHIELD WIPERS OF AUTOMOTIVE VEHICLES

TECHNICAL FIELD

The present invention relates to wiper arms and more particularly to wiper arms having a U-shaped arm head.

BACKGROUND OF THE INVENTION

Wiper arms of this general type are known in many different varieties. For instance, according to FR-A 2 517 609, the connecting head is unrotatably coupled to the drive shaft of the wiper drive which is arranged below the windshield of the automotive vehicle and is oscillated by means of a known mechanism. To be able to lift the wiper from the windshield, the arm head is pivoted at the connecting head about the mentioned mounting axis, which extends roughly perpendicular to the wiper drive shaft. A tension spring is typically employed for urging the wiper blade firmly against the windshield.

In order to ensure the proper contact pressure of the wiper at the windshield and its correct alignment in relation to the windshield surface, the wiper holder must be aligned in relation to the windshield surface, which may be different in various vehicle designs. Ideally the wiper blade should be maintained perpendicular to the windshield surface.

This objective is achieved, for instance, by bending the wiper rod by the necessary angle. When the turning range is short, a bent wiper rod is generally considered to be unattractive and accordingly it is generally not accepted by car designers. On the other hand, when a long turning range is chosen, the wiper rods do not lend themselves to satisfactory manufacture by a corresponding automaton because they differ one from another in their response to subsequent processing. For example the response of long wiper rods tends to vary one from another when subject to forces which cause the wiper rods to yield elastically. Frequently, wiper rods must be "realigned" after painting, since they may have been influenced by stresses associated with the application of heat used during the painting (e.g. stove-enamelling) process.

In contrast thereto, the mentioned FR-A 2 517 609 suggests to transfer the bending function to the connecting head so that a wiper rod can be used which is not bent. This variant, too, is unattractive and its use is not possible in all applications because of the space required by this design. In addition, its manufacturing costs are high.

Consequently, an object is to improve a wiper arm of the type initially referred to such that it can be furnished with the necessary bending and still be attractive inexpensive to manufacture.

A conventional, unbent connecting head can be used with this wiper arm. Further, bending of the wiper rod is not required. Nevertheless, the necessary bending angle is achieved by shifting the bending function to the arm head. Usually, the arm head is long enough to ensure a slight bending, which is hardly perceivable under conventional bending angles. Manufacturing and assembling this arm head is not more difficult than manufacturing a conventional arm head. Also the arm head is as easy to access (for maintenance) as conventional heads. Of course, bending the arm head is effected without step, (i.e. that means continuously from one end to the other). Conventionally, it can be made from a plane sheet metal, and the attachment of the conventional appendages such as the wiper rod and swivel connection with the connecting head is possible using conventional techniques.

Preferably, the bending angle of the arm head is approximately 15°. Thereby, the correct alignment of the wiper blade in relation to the windshield surface is accomplished in the designs found in most late model vehicles.

Another embodiment of the present invention is characterized in that the lateral distance of the lateral legs of the arm head at the end close to the wiper rod is less than the lateral distance of the lateral legs at the end close to the connecting head, that means, the head arm tapers from the connecting head to the wiper rod.

A particularly preferred embodiment of the present invention is characterized in that, at the end of the arm head close to the wiper rod, the two lateral legs are deflected in relation to one another in order to enclose and retain the associated wiper rod end at least in part. First, the loose arm head has a U-shaped cross section quasi over its entire length. After the wiper rod has been inserted into the end of the arm head close to the wiper head, the U-legs are deflected in relation to one another and, as a result, the wiper rod at the arm head is attached. Accordingly, the arm head does not only taper towards the wiper rod, in addition, its height reduces from the connecting head to the wiper rod, when viewed over the length.

An improvement of the present invention is characterized in that each of the lateral legs at the wiper-rod-sided front edge of the arm head, prior to the deflection, encloses with the cross bar an identical angle of, preferably, somewhat more than 90°. The latter provision permits ease of insertion of the wiper rod.

Another second embodiment of the present invention is described. The choice of implementing one of the two embodiments depends on the size of the arm head, the material used and the type of automation used. Also, the design of the tool used to manufacture the arm head can play a decisive role.

DETAILED DESCRIPTION OF THE PREFERRED EMBODIMENTS

Figure 1:
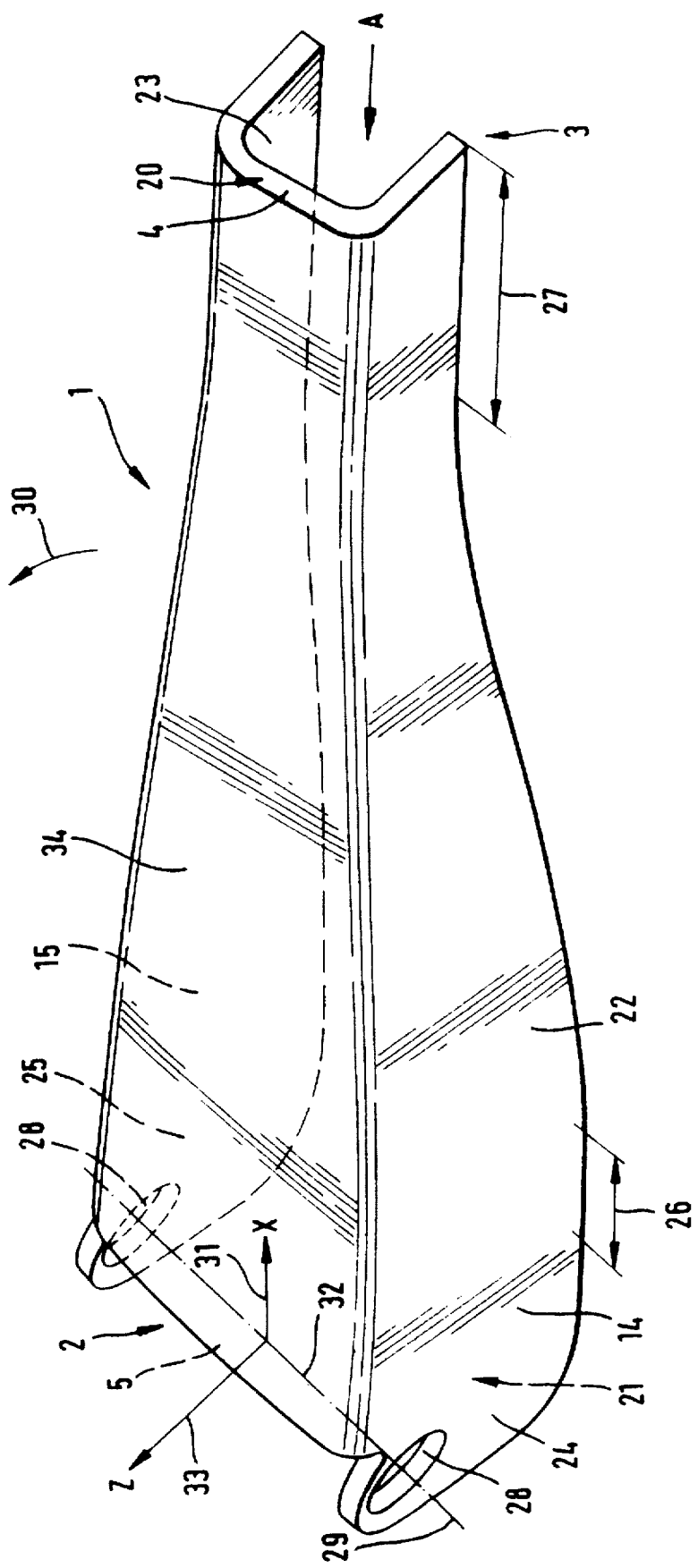
FIG. 1 is a perspective view of the arm head of the present invention.

Now referring to FIG. 1, in the loose condition (i.e. prior to its connection with a wiper rod) according to FIG. 1, the arm head 1 has the shape of a U bar, the end 2 close to the connecting head being broader and higher than the end close to the wiper rod.

Figure 2:
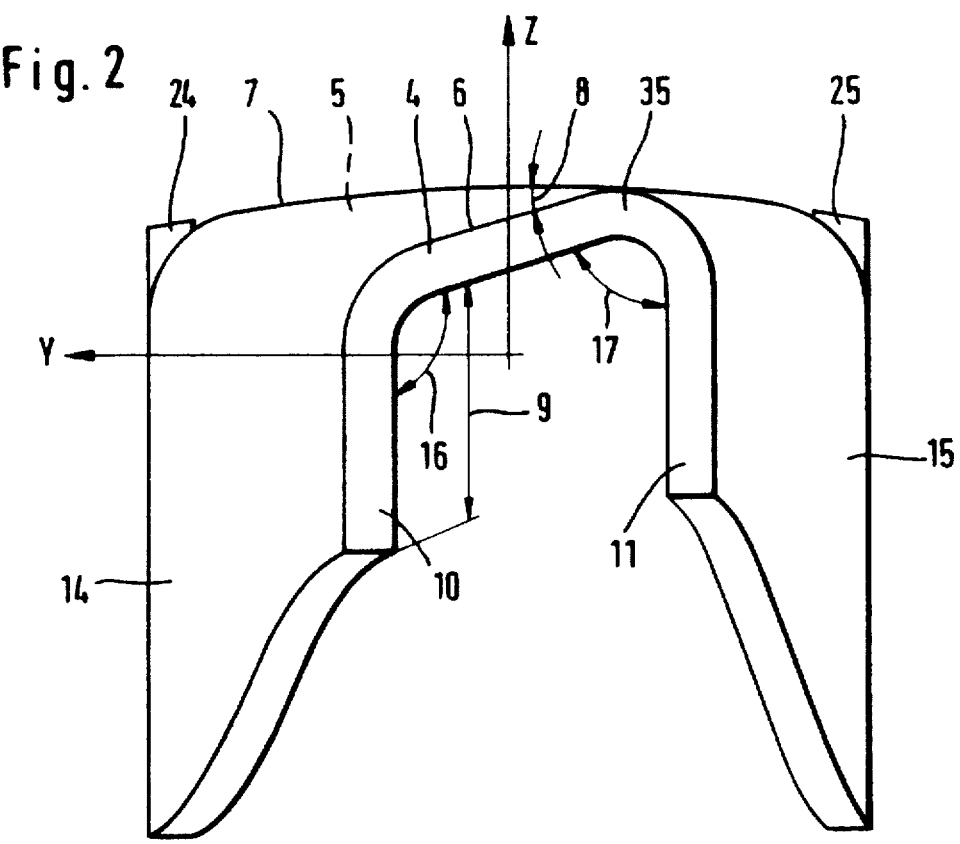
FIG. 2 is a view of the arm head of FIG. 1, when viewed in the direction of the arrow A.
Figure 3:
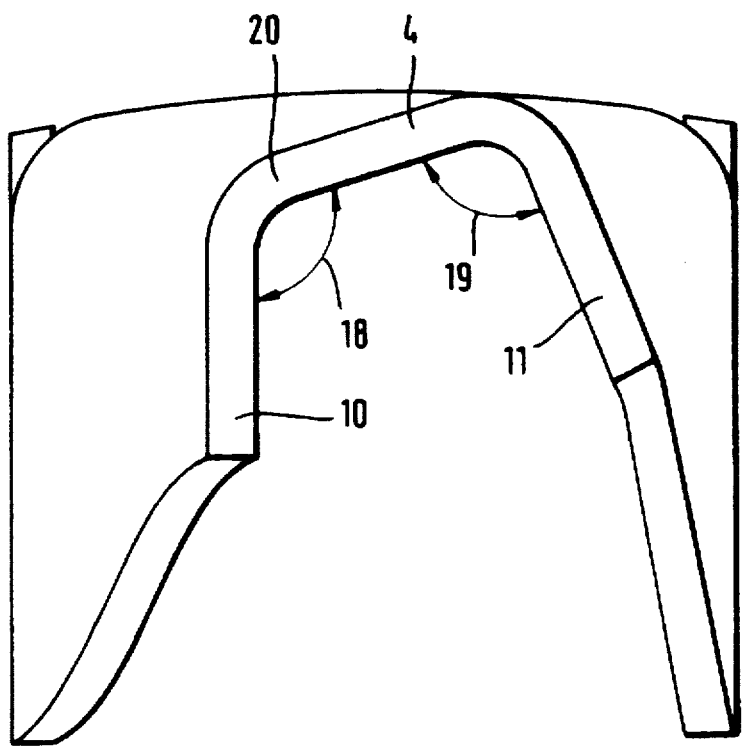
FIG. 3 is a representation of a second embodiment of the present invention corresponding to FIG. 2.
Figure 4:
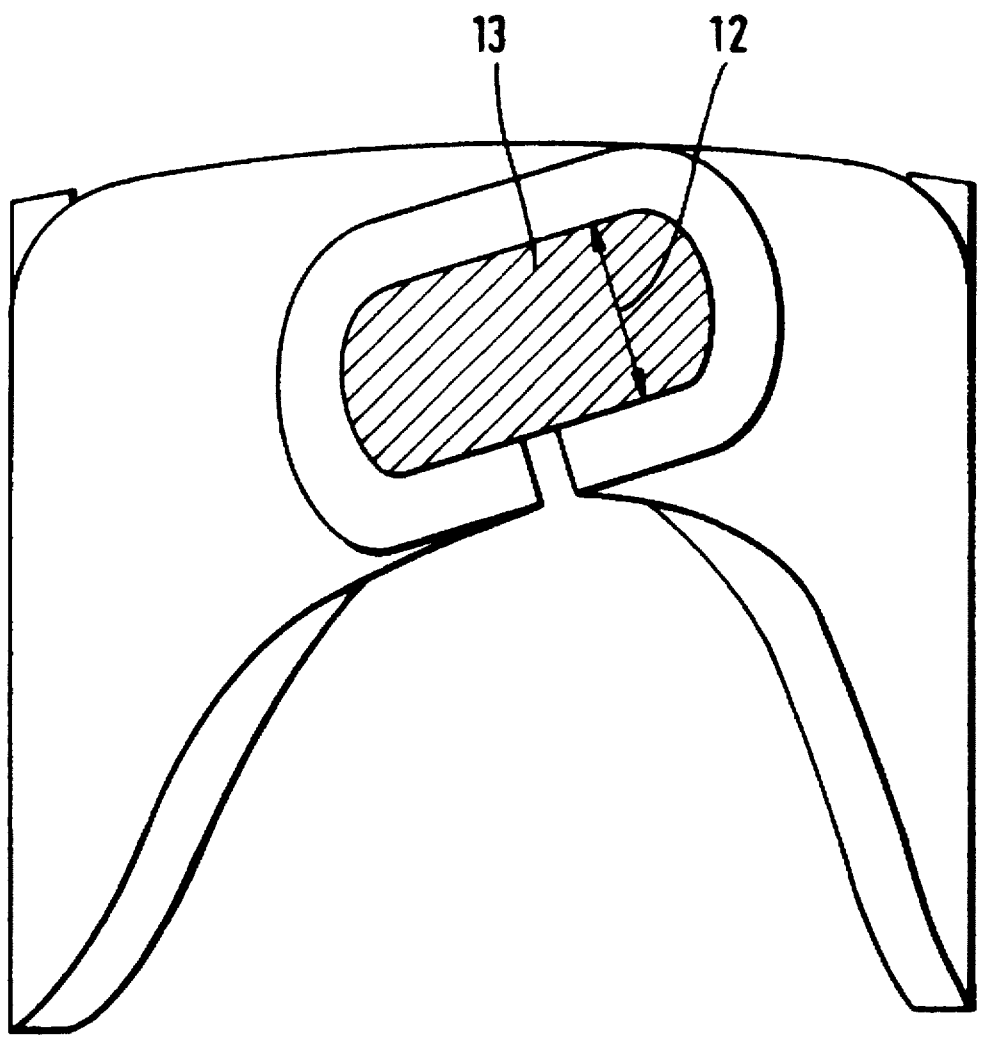
FIG. 4 is the arm head of FIG. 2 or FIG. 3, respectively, with the wiper rod installed.

However, it can be taken from FIGS. 2 to 4 that the cross bar 4 of the end 3 close to the wiper rod is inclined towards the cross bar 5 of the end 2 close to the connecting head so that the upper boundary edges 6 and 7 in a projection into an Y-Z plane form an acute angle 8. In the conventional inclined positions of the wiper blade holder and the wiper blade, too, this angle 8 is in the order of 15°.

It can be seen in FIGS. 2 and 4 that the length 9 of the lateral legs 10 and 11 at the end 3 of the arm head 1 close to the wiper rod exceeds the thickness 12 of the wiper rod 13.

For instance, FIG. 2 shows that the lateral legs 14 and 15 at the frontal end close to the connecting head have a larger lateral distance than the lateral legs 10 and 11 at the end 3 of the arm head 1 close to the wiper rod. Further, the legs 14 and 15 are longer than the lateral legs 10 and 11, preferably, they are about twice as long. In the embodiment of FIG. 2, the lateral legs 10 and 11 extend in parallel to one another at the end 3 close to the wiper rod, and accordingly they form different angles 16 and 17 with the transversely extending cross bar 4.

In contrast thereto, the angles 18 and 19, which enclose the lateral legs 10 and 11 at the wiper-rod-sided end 3 of the arm head 1 with the associated cross bar 4 in the embodiment according to FIG. 3, are at least roughly identical. Nevertheless, finally, the shape of the mounted arm head 1 to be taken from FIG. 4 will ensue in both embodiments. However, on the other hand, the result is that the lateral legs 10 and 11 of the embodiment of FIG. 2 extend in parallel to each other and also in parallel to the lateral legs 14 and 15 at the end of the arm head 1 close to the connecting head, while the two lateral legs 10 and 11 in the second variant of the present invention according to FIG. 3 form an acute angle in relation to one another.

In both embodiments, the frontal edge 18 close to the wiper rod extends in parallel to a cross-section 21 close to the connecting head. The side flanks 22 and 23 of the arm head 1 are extended in FIG. 1 to reach beyond this imaginary cross-section 21, mounting lugs 24 and 25 being formed thereby. Thus, only the cross bar of the imaginary cross-section 21 close to the connecting head forms a physical edge, which corresponds to the mentioned cross bar 5 at the end 2 of the arm head 1 close to the connecting head. Over an area 26 and 27, respectively, the side flanks 22 and 23 of the arm head 1 extend in parallel to one another, and between these areas the intermediate portion is disposed which narrows and decreases in height. Each of the two mounting lugs 24 and 25 are provided with a mounting bore 28. Likewise, the geometrical mounting axis 29 of the arm head 1 is defined by these two mounting bores 28. The arm head 1 can be swivelled about this mounting axis 29 as indicated by arrow 30 in order to lift the wiper blade (not shown) holder including the wiper blade from the windshield of the automotive vehicle.

In FIG. 1, a coordinate system with the coordinate axes 31, 32 and 33 is shown, the Y-Z plane being defined by the frontal edge of the cross bar 5 at the end 2 of the arm head 1 close to the connecting head. The X-axis 31 symbolizes a longitudinal axis of the arm head 1. For example, it can be taken from FIG. 2 that the two lateral legs 14 and 15 have a like lateral distance from an imaginary X-Z plane. This is substantially maintained until the end 3 close to the wiper rod. However, the right-hand lateral leg 11 in the embodiment, sideways, is somewhat farther away from this X-Z plane than the left-hand lateral leg 10, as can easily be seen in FIG. 2. However, this is not connected with the present invention but is a special feature of this arm head. Basically the same applies to the dimensions of the individual component parts of the arm head 1.

It follows from the preceding explanations that the upper wall 34 of the arm head 1, which according to the above representations and in accordance with FIGS. 2 and 3 represents a spatially curved or bent surface, extends at right angles relative to the two lateral legs 14 and 15 and can extend over the length of the area 26, for example. In case such a plane partial area of the wall 34 is provided, the transition into the inclined, substantially longer wall portion is without a step.

From FIGS. 2 and 3 it can easily be seen that the corner portion 35, which is higher in use, in the projection extends preferably flush with the cross bar 5 of the end 2 close to the connecting head.

We claim:

1. An arm head comprising:

an elongated body extending along an X-axis, said body having first and second opposite ends, said body being substantially U-shaped in transverse cross section between said first and second ends to define an upper wall with a pair of laterally spaced generally planar legs depending therefrom, said first end including means for connection with a wiper connecting head, said second end including means for connecting with a wiper rod end, wherein said first end has a generally flat first cross bar portion extending laterally along a Y-axis perpendicular to said X-axis and said second end has a generally flat second cross bar portion, said first cross bar portion includes a first upper boundary edge and said second cross bar portion includes a second upper boundary edge, wherein respective projections of said first and second boundary edges into a Y-Z plane defined by said Y-axis and a Z-axis perpendicular to said X-axis and said Y-axis form an acute angle therebetween.

2. An arm head as claimed in claim 1, wherein said acute angle is approximately 15°.

3. Am arm head as claimed in claim 1, wherein a first lateral distance between said pair of laterally spaced legs at said second end is less than a second lateral distance between said pair of laterally spaced legs at said first end.

4. An arm head as claimed in claim 3 wherein said pair of laterally spaced legs at said second end defines said means for connection with a wiper rod end.

5. An arm head as claimed in claim 4, wherein said laterally spaced legs at said first end are about twice as long as said pair of laterally spaced legs at said second end.

6. An arm head as claimed in claim 4 wherein each one of said pair of laterally spaced legs extend from said second generally flat cross bar portion such that each one of said pair of laterally spaced legs form at an angle greater than 90° with said second cross bar portion.

7. An arm head as claimed in claim 4 wherein said pair of laterally spaced legs at said first end are generally parallel to said pair of laterally spaced legs at said second end, and wherein each one of said pair of laterally spaced legs at said first end are generally perpendicular to said first cross bar portion.

8. An arm head as claimed in claim 1 wherein said first end terminates in a first plane and said second end terminates in a second plane, wherein said first and second planes are generally parallel.

9. An arm head as claimed in claim 8, wherein said pair of laterally spaced legs are generally mirror images relative to an X-Y plane defined by said X-axis and said Z-axis.

10. An arm head as claimed in claim 8 wherein each one of said pair of laterally spaced legs, at said first end, extend into a respective mounting lug portion having a respective mounting bore formed therethrough.

* * * * *

UNITED STATES PATENT AND TRADEMARK OFFICE
CERTIFICATE OF CORRECTION

PATENT NO.   :   5,564,158
DATED        :   October 15, 1996
INVENTOR(S)  :   Bauer et al It is certified that error appears in the above-indentified patent and that said Letters Patent is hereby corrected as shown below:

In column 4, line 34, delete "Am" and substitute therefor --An--

Signed and Sealed this

Tenth Day of December, 1996

Attest:

BRUCE LEHMAN

*Attesting Officer*     *Commissioner of Patents and Trademarks*